May 26, 1925.  1,539,389
W. F. GAFFNEY ET AL
GUIDE LIGHT FOR AUTOMOBILES
Filed Oct. 17, 1923     2 Sheets-Sheet 1
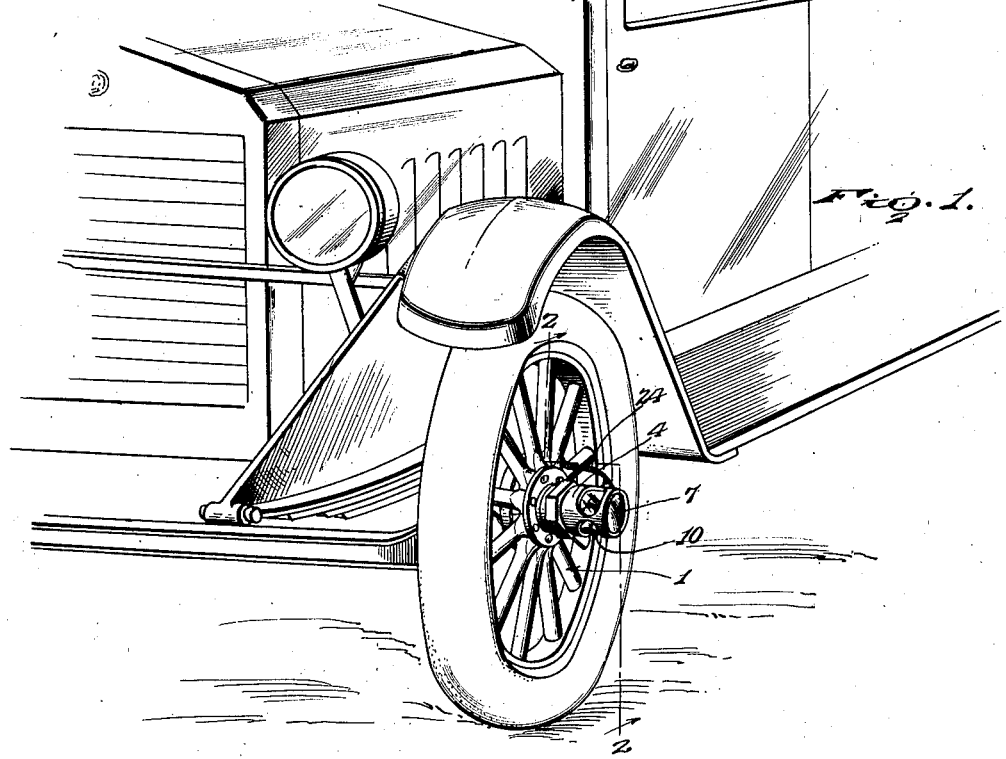
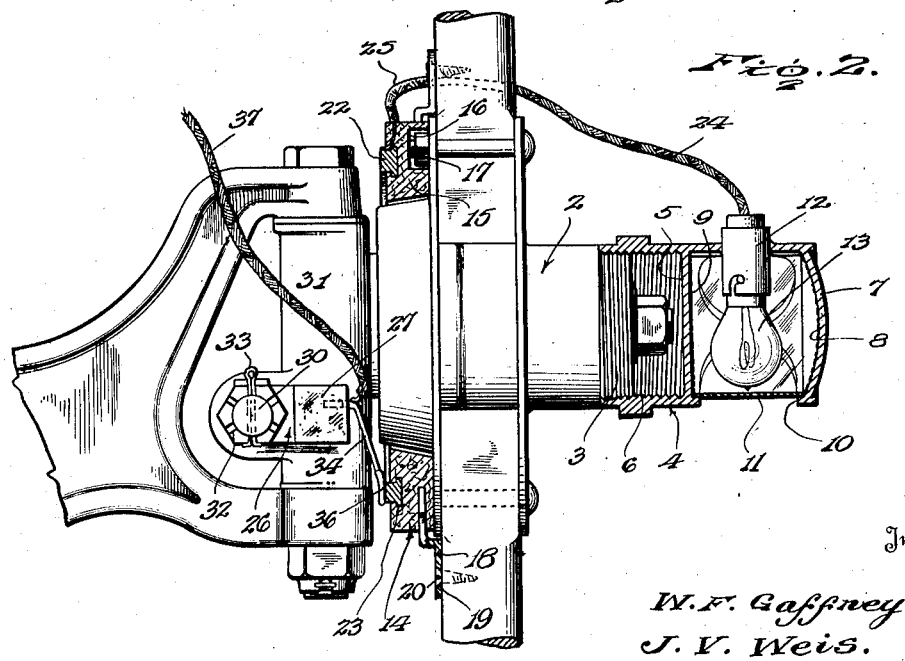
Inventors
W. F. Gaffney.
J. V. Weis.
By Lacey & Lacey, Attorneys

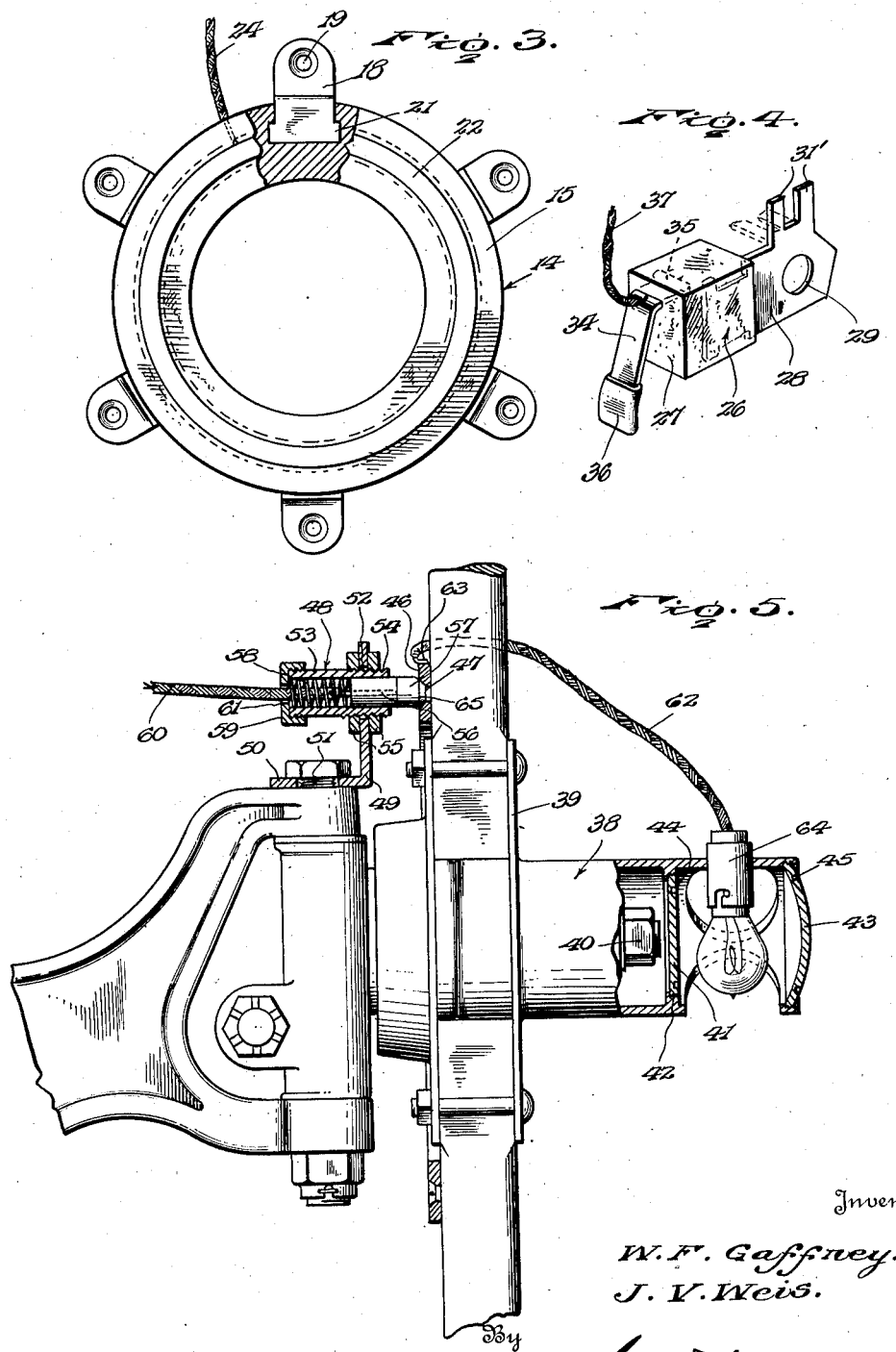

Patented May 26, 1925.

1,539,389

UNITED STATES PATENT OFFICE.

WILLIAM F. GAFFNEY AND JOHN V. WEIS, OF ALBANY, NEW YORK.

GUIDE LIGHT FOR AUTOMOBILES.

Application filed October 17, 1923. Serial No. 669,109.

*To all whom it may concern:*

Be it known that WILLIAM F. GAFFNEY and JOHN V. WEIS, citizens of the United States, residing at Albany, in the county of Albany and State of New York, have invented certain new and useful Improvements in Guide Lights for Automobiles, of which the following is a specification.

This invention relates to an improvement in guide lights for motor vehicles.

Due to the more or less common use, by motorists, of glaring headlights, notwithstanding State laws to the contrary, and likewise to the use of spot lights, night driving involves more or less danger. A motorist approaching an oncoming car equipped even with well regulated headlights, is unable to determine with any degree of certainty the precise arrangement of the headlights with relation to the wheels of the approaching car and, if the road is narrow, or the cars are being, either or both of them, driven recklessly, there is likelihood of one car side-swiping the other with more or less serious consequences. A cautious driver will drive as far as possible to the right hand side of the road to avoid such accidents, but in doing so he runs risks due to liability to run off of the road. Even where the headlights of a machine are properly adjusted so that the light rays are thrown more downwardly onto the road than in a straight ahead direction, the outlines of an approaching car are still indistinct, so that it is evident that regardless of the precautions which may be taken and regardless of a strict compliance with the various State laws regarding headlights, the liability of accidents still prevails. These conditions do not exist in daylight for the reason that each motorist may observe the outlines of the approaching car and, with a due exercise of care and skill, may so gage distance as to pass each other with perfect safety. It is evident therefore that if, during the night hours, conditions could be established approaching those prevailing during daylight hours, a great many accidents could be avoided. Therefore, it is the object of the present invention primarily to provide means for illuminating the left front wheel of a motor vehicle so that the driver of an approaching car may readily perceive the precise location of the wheel and gage his distance and drive accordingly. Thus not only does the driver of the car equipped with the invention protect himself and his property against injury by guiding an approaching car, but he likewise gives assistance to a driver of an approaching car not equipped with the invention by enabling the driver to observe the position of his left front wheel and thereby take due precautions in passing on the road.

Another important object of the invention is to provide a device for the purpose stated which will be inconspicuous and yet so constructed as to practically flood the left front wheel of the vehicle upon which it is installed, with brilliant light rays so that the whole contour of the wheel and its location may be readily discerned.

Another important object of the invention is to so construct the device that it may be applied to any of the standard vehicle wheels and associated parts thereof without any alteration of such parts and without in any way interfering with steering of the machine or free rotation of the wheel as under ordinary conditions.

Another object of the invention is to so construct the device that current may be supplied to the lamps thereof by an extremely simple arrangement of wiring not liable to become disarranged and capable of being installed by any person of ordinary intelligence.

Another object of the invention is to provide an illuminating device for the purpose stated so constructed and adapted to be so mounted that more or less light will be thrown upon the roadway immediately in advance of the left front wheel of the vehicle so that the driver of the vehicle may himself obtain the further benefit from the device of being enabled to observe the character of the roadbed over which he is driving.

Another object of the invention is to so construct the device and provide for its mounting upon the wheel hub in such a manner that the supply of current to the lamp of the device may be controlled from the dash of the machine.

In the accompanying drawings:

Figure 1 is a perspective view of the device installed upon an automobile, so much of the automobile as is necessary to illustrate the application of the invention, being likewise shown in the said figure;

Figure 2 is a detail vertical sectional view on the line 2—2 of Figure 1 looking in the direction indicated by the arrows;

Figure 3 is a side elevation of the wheel attached contact member of the device;

Figure 4 is a perspective view of the contact member which coacts with the member shown in Figure 3;

Figure 5 is a view similar to Figure 2 illustrating a modification of the invention.

In the drawings, the numeral 1 indicates in general the left front wheel of an automobile and the numeral 2 indicates in general the hub of the wheel. In that form of the invention shown in Figs. 1 and 2 of the drawings, the hub 2 is provided with the usual threaded outer end 3 to which, ordinarily, the usual hub cap is applied. In the present invention, however, this hub cap is replaced by a lamp casing which is indicated in general by the numeral 4. The casing 4 comprises a substantially cylindrical body provided interiorly at a suitably located point between its ends with a partition wall 5 and, interiorly threaded between the said wall and what will constitute the inner end of the casing when the casing is applied to the hub, the threads being indicated by the numeral 6 and adapting the casing at its said end to be fitted onto the threaded end 3 of the hub 2. The other end of the casing is closed as indicated by the numeral 7, and the end wall of the casing is preferably of the concavo-convex form shown clearly in Figure 2 of the drawings, the inner surface of the said wall, indicated by the numeral 8, being highly polished or mirrored so as to constitute a reflecting surface for purposes which will hereinafter be explained. Also, for reasons which will presently be pointed out, the face of the wall 5 which opposes the end wall 7 of the casing and which face is indicated by the numeral 9, is highly polished or mirrored so that it will constitute a reflecting surface, it, however, being plane. The circumferential wall of the lamp casing 4 between the end wall 7 and the partition wall 5, is formed with a circumferential series of openings 10, or slots may be formed at intervals circumferentially in this wall, or the wall may be entirely cut away except for a bridging or connecting web at one point in its circumference. Preferably a small cylinder or a sheet bent to cylindrical form of isinglass, indicated by the numeral 11, is arranged within the casing between the end wall 7 and partition wall 5 and extends over the openings 10 so that gravel, dirt, mud, and other foreign matter, will be prevented from entering this portion of the casing, although there will be no interference to light rays passing through the said openings 10. Mounted in the wall of the casing 4 between two of the openings 10 or in the web portion of said wall, above referred to, if the wall is formed with a substantially continuous opening or slot, is a lamp socket 12 in which is fitted the base of an electric light bulb 13. In order that current may be supplied to the lamp 13, means is provided which will now be described.

The means above referred to comprises a contact member which is indicated in general by the numeral 14 and which consists of an annular body 15 of fiber or other insulating material of an internal diameter to adapt it to fit over the inner end of the hub so that one face of the body may be brought into position resting flat against the face of the inner hub plate, the said face of the body 15 being provided at suitable intervals with recesses 16 to accommodate the nuts upon the hub bolts 17. Small attaching bracket members 18 are embedded in the insulating body 15 at suitable intervals and project radially from the periphery of the body and are provided with openings 19 for the passage of screws 20 which are driven into the spokes of the wheel, the body being in this manner securely anchored upon the wheel for rotation therewith. It is preferable that the said bracket members 18 be provided at their anchored ends with laterally projecting anchoring lugs 21 which will preclude any likelihood of the bracket members working loose from the body 15. Associated with the insulating body member 15 is a contact ring 22 preferably flanged at one side or face as indicated by the numeral 23 and embedded at this portion in the inwardly presented face of the said body 15, the ring 22 at its opposite side projecting slightly beyond the said inwardly presented face of the insulating body 15. A conductor wire 24 is connected with the socket 12 and is led between two of the spokes of the wheel and into the insulating body 15 and electrically connected, as at 25 with the ring 22.

For cooperation with the contact member 14, there is provided a second contact member indicated in general by the numeral 26 and most clearly illustrated in Figure 4 of the drawings. This member comprises a block 27 of insulating material in which is embedded one end of an attaching plate indicated by the numeral 28. The said plate 28 is formed with an opening 29 to receive the usual bolt 30 upon the steering knuckle 31 of the automobile, and when the plate is fitted onto the bolt, spaced tongues 31' which project from one edge of the plate, are bent up to engage against one face of the nut 32 which is threaded upon the bolt 30, the usual cotter pin 33 which is fitted through the bolt 30 and through the notches in the castellated nut 32, being received between said tongues 31'. The numeral 34 indicates a metallic leaf spring which is embedded at one end, as at 35, in the insulating block 27, and at its free end this spring supports a contact button 36 preferably of copper. By reference now to Figure 2 of the drawings it will be observed that when the parts are properly mounted, the leaf spring 34 will maintain the contact button 36 firmly in contact, at all times, with the contact ring 22, and inasmuch as the contact member 26 is mounted upon the steering knuckle and therefore turns with the wheel and its spindle, the button 36 will be continuously in contact with the said ring 22 regardless of the operation of the steering mechanism. A conductor wire 37 is electrically connected with the spring 34 and this wire will, in practice, be led to a suitable switch upon the dash of the automobile or located at some other point where it may be conveniently manipulated by the driver, the customary connections being made with the battery and ground as in the wiring of a headlight, spot light, or parking light.

From the foregoing description of this form of the invention it will be understood that when the switch controlling the supply of current to the lamp 13 is turned on, light rays from the lamp will be reflected from the reflecting surface 8 through the openings 10 in the direction of the wheel 1, such light rays as strike the reflecting surface 9 being reflected to the surface 8 and from this surface likewise through the openings 10. In this manner, the wheel will be fully illuminated and will be clearly visible to the driver of an approaching car, thereby enabling the said driver to judge his distance in passing and enabling him to proceed with greater assurance than under ordinary conditions. It will also be understood that not only will the wheel be illuminated, but likewise light will be thrown onto the road substantially in the path of travel of the wheel so that this portion of the road surface, which ordinarily is not illuminated, will be more or less visible to the driver of the car.

In that form of the invention shown in Figure 5 of the drawings, identically the same principles are involved as in the previously described form, the only difference residing in certain structural changes which may be made if found desirable. In this modified structure the lamp casing, which is indicated by the numeral 38, is preferably formed integral with the hub flange 39 of the wheel, and in order that access may be had to the spindle nut 40 of the wheel, the partition wall, which corresponds to the partition wall 5 in the previously described form and which is here indicated by the numeral 41, is in the nature of a disc having a threaded periphery adapting it to be seated in a threaded annular flange 42 formed upon the inner surface of the circumferential wall of the lamp casing. Likewise, in this form of the invention, the outer end wall of the casing which corresponds to the wall 7 in the previously described form and which is here indicated by the numeral 43, is in the nature of a concavo-convex disc which is threaded at its periphery and removably fitted into the outer end of the casing 38. The walls 41 and 43 may be provided respectively with notches 44 and 45 for the application of a spanner wrench or other tool for the purpose of removing the walls and replacing them.

In this form of the invention, the insulating body 15 of the previously described form is dispensed with, and a contact ring 46 is mounted, by screws 47, directly upon the inner side of the wheel, the screws entering the spokes as in the first described form. Likewise, in this form, the relatively fixed contact member which corresponds to the member 26, is of a somewhat different structure. This member is indicated in general by the numeral 48 and the same comprises a bracket 49 having a base portion 50 which is secured upon the spindle bolt 51 and is provided in its upstanding portion with an opening 52. A small barrel 53 has a threaded end portion 54 which is fitted through the opening 52, and nuts 55 are threaded onto the said portion 54 and are tightened to bind against the opposite sides of the said upstanding portion of the bracket 49. Slidably mounted in the bore of the barrel 53 is a plunger 56 provided at its outer end with a metallic contact button 57, and a spring 58 within the barrel 53 bears at one end against the inner end of the said plunger and at its other end against a cap 59 which is fitted onto the inner end of the said barrel. The body of the plunger 56, or, in other words, that portion other than the button 57, is of insulating material, and a conductor wire 60 is led through an opening 61 in the cap 59 and through the coils of spring 58 and, after extending axially through the body of the plunger 56, it is electrically connected to the contact button 57. This wire 60 corresponds in every respect to the wire 37 of the previously described form of the invention. A wire 62 is electrically connected, as at 63, with the contact ring 46 and is likewise electrically connected within a lamp socket 64 mounted in the wall of the lamp casing 38. It will be evident that the spring 58 will at all times hold the contact button 57 in contact with the face of the contact ring 46, and to compensate for any slight play of the wheel with relation to the spindle bolt and its mounting, the end of the contact button is preferably rounded, as indicated by the numeral 65.

It will be understood, of course, that various other modifications may be made without departing from the spirit of the invention. For example, various other means might be employed for supplying current to the lamp of the device. Likewise the lamp casing might be formed otherwise than as shown in the drawings, and its structure modified in various ways.

If desired the contact device 48 shown in Figure 5 of the drawings may be employed in connection with a contact device such as the device 14 in Figure 2, and, on the other hand, a contact device such as the one shown in Figure 2 and indicated by the numeral 26 may be employed in connection with a contact ring such as the ring 46 in Figure 5.

Having thus described the invention, what is claimed as new is:

1. An automotive vehicle having an extending hub cap, on at least one of its wheels, and rotating therewith, a source of illumination within said extension and means for directing the light rays from said source of illumination onto the wheel to illuminate the same.

2. The combination with a vehicle, of a source of illumination arranged substantially adjacent the axis of a wheel thereof and rotating therewith, and a reflector arranged in juxtaposition to the source of illumination and facing the said wheel whereby to reflect the light rays from the source onto the wheel to illuminate the same.

3. The combination with an automotive vehicle including a supporting wheel and its mounting providing for pivotal turning movement of the wheel with relation to the mounting, said wheel having an extending hub cap, of a source of electrical illumination within the hub cap and rotating therewith and means associated with the cap for directing the light rays onto the wheel to illuminate the same, and coacting means upon the wheel and the support therefor for establishing electrical communication between a source of electrical supply and said source of illumination.

4. The combination with a vehicle front wheel and a fixed part of its turning spindle mounting, of a source of electrical illumination upon the wheel and rotating therewith and positioned to direct its light rays onto the wheel to illuminate the same, and coacting electrical contact means upon the wheel and the said fixed part for maintaining electrical communication between the source of illumination and a source of current supply.

5. The combination with a vehicle front wheel and a fixed part of its turning spindle mounting, of a source of electrical illumination upon the wheel and rotating therewith and positioned to direct its light rays onto the wheel to illuminate the same, an annular contact member upon the wheel concentric to its axis of rotation, and electrically connected with the source of illumination, a contact member upon the said fixed part in contact with the first mentioned contact member, and an electrical conductor electrically connected with the second-mentioned contact.

6. Means for illuminating a vehicle wheel comprising a casing embodying means adapting it for application to the hub of the wheel, the casing having an opening in its circumferential wall, a source of illumination within the casing, and means for directing the light rays from the source of illumination through the opening and onto the wheel to illuminate the wheel.

7. Means for illuminating a vehicle wheel comprising a casing embodying means adapting it for application to the hub of the wheel, a source of illumination within the casing, the wall of the casing having a circumferential light ray transmitting opening, and a reflector within the casing for reflecting the light rays from the source of illumination through the said opening and onto the wheel.

8. The combination with a vehicle front wheel and its turning spindle mounting, of a source of electrical illumination upon the wheel positioned to direct its light rays onto the wheel to illuminate the same, an electrical conductor extending from the said source of illumination between the spokes of the wheel, an annular contact member secured upon the inner side of the wheel, the said conductor being connected with the contact member electrically, an insulating base mounted upon the said turning spindle mounting, an electrical conductor, a spring tongue upon the said insulating base to which the last mentioned conductor is electrically connected, and a contact button upon the said spring tongue contacting the said annular contact member.

9. The combination with a vehicle front wheel and its turning spindle mounting, of a source of electrical illumination upon the hub of the wheel positioned to direct its light rays onto the wheel to illuminate the same, an annular base of insulating material disposed against the inner face of the wheel and surrounding the hub, an annular contact ring carried by the base, an electrical conductor electrically connected with the contact ring and extending between the spokes of the wheel and to the source of illumination, a bracket mounted upon the turning spindle mounting, a block of insulating material supported by the bracket, a spring tongue embedded at one end into the block and bearing at its free end against the said annular contact ring, and an electrical conductor electrically connected with the spring tongue.

10. A hub cap for an automobile having an opaque body portion adapted to be screwed to the wheel hub, a light-transmitting portion at its end which extends beyond the opaque portion and is visible from points directly in front of or in the rear of the wheel when the hub cap is applied thereto and a source of light within the hub cap so situated that the light will be transmitted through the light-transmitting portion in a direction transverse to the axis of the hub cap.

11. The combination with an automobile having a front wheel, of a hub cap thereon provided with an opaque body portion which is screw-threaded to the hub of the wheel and a light-transmitting end extending beyond the opaque portion and which is visible from points directly in front of or in the rear of the wheel, and a bulb within the hub cap situated so that the light therefrom will be transmitted through the light-transmitting portion in a direction fore and aft of the car.

12. A hub cap for an automobile comprising a metal body portion adapted to be screw-threaded to the wheel hub, a light-transmitting portion at the end extending beyond the metal portion, whereby it is visible from points directly in front of the wheel when the hub cap is applied thereto, a partition within the hub cap dividing the interior thereof in a grease-receiving chamber and a bulb-receiving chamber, and a bulb so situated in the bulb-receiving chamber that the light therefrom will be transmitted through the light-transmitting portion in a direction transverse to the axis of the hub cap.

13. The combination with a vehicle wheel, of an electric lamp mounted upon the hub of said wheel, means whereby current may be supplied to the lamp, said means including a collector ring carried by the wheel hub and a stationary contact arm engaging said ring and means for controlling the supply of current.

In testimony whereof we affix our signatures.

WILLIAM F. GAFFNEY. [L. S.]
JOHN V. WEIS. [L. S.]